United States Patent
Kishimoto

(10) Patent No.: US 8,572,061 B2
(45) Date of Patent: Oct. 29, 2013

(54) INFORMATION PROCESSING APPARATUS, IMAGE FORMING APPARATUS, AND CONTROL METHOD THEREFOR

(75) Inventor: Norihisa Kishimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 12/933,375

(22) PCT Filed: Mar. 17, 2009

(86) PCT No.: PCT/JP2009/001170
§ 371 (c)(1),
(2), (4) Date: Sep. 17, 2010

(87) PCT Pub. No.: WO2009/116265
PCT Pub. Date: Sep. 24, 2009

(65) Prior Publication Data
US 2011/0022632 A1 Jan. 27, 2011

(30) Foreign Application Priority Data
Mar. 21, 2008 (JP) ................................. 2008-073686

(51) Int. Cl.
*G06F 17/30* (2006.01)
(52) U.S. Cl.
USPC .......................................... 707/705; 707/706
(58) Field of Classification Search
USPC ................................................. 707/705, 706
See application file for complete search history.

(56) References Cited

U.S. PATENT DOCUMENTS

| | | | |
|---|---|---|---|
| 7,272,644 B1* | 9/2007 | Kumar | 709/223 |
| 2005/0076374 A1* | 4/2005 | Nakamura | 725/81 |
| 2006/0044607 A1 | 3/2006 | Kato | |

FOREIGN PATENT DOCUMENTS

| | | |
|---|---|---|
| JP | 2001-060972 A | 3/2001 |
| JP | 2001-216107 A | 8/2001 |
| JP | 2005-250694 A | 9/2005 |
| JP | 2006-099741 A | 4/2006 |
| JP | 2007-272340 A | 10/2007 |

* cited by examiner

*Primary Examiner* — Baoquoc N To
(74) *Attorney, Agent, or Firm* — Canon USA, Inc., IP Division

(57) ABSTRACT

An information processing apparatus includes a receiving unit configured to receive a search request sent from an external apparatus, a search unit configured to search for a device matching a search condition included in the search request, a determination unit configured to determine an attribute of a device, and a transmission control unit configured to perform control so that information regarding the device is sent to the external apparatus as a search result in response to the search request when the device matching the search condition has a first attribute and so that the information regarding the device is not sent to the external apparatus as a search result in response to the search request when the device matching the search condition has a second attribute.

7 Claims, 20 Drawing Sheets

FIG. 6

| ID | UUID | VERSION | DEVICE TYPE | MODEL NAME | DEVICE NAME | URL | ATTRIBUTE VALUE |
|---|---|---|---|---|---|---|---|
| 1 | 123456 | 1 | PRINTER | LBPXXXX | Dev Printer | http://192.168.0.1/wsd/mex | private |
| 2 | 987654 | 1 | PRINTER | LBPYYYY | Sales Printer | http://192.168.0.2/wsd/mex | public |
| 3 | abcdef | 1 | MFP | MFPXXXX | Dev MFP | http://192.168.0.3/wsd/mex | public |

FIG. 7

```
<Envelope>
    <Header>
        <Action>Hello</Action>
        <MessageID>1</MessageID>                    }701
        <To>urn:discovery</To>
    </Header>
    <Body>
        <Hello>
            <EndpointReference>
                <Address>urn:uuid:123456</Address>
            </EndpointReference>                     }702
            <Types>MFP</Types>
            <XAddrs>http://192.168.0.1/wsd/mex</XAddrs>
            <MetadataVersion>1</MetadataVersion>
        </Hello>
    </Body>
</Envelope>
```

FIG. 8

```
<Envelope>
    <Header>
        <Action>Get</Action>
        <MessageID>1</MessageID>
        <To>urn:uuid:123456</To>
    </Header>
    </Body>
</Envelope>
```

FIG. 9

```
<Envelope>
    <Header>
        <Action>GetResponse</Action>
        <MessageID>1</MessageID>
        <To>anonymous</To>
    </Header>
    <Body>
        <Metadata>
            <MetadataSection>
                <ThisDevice>
                    <FriendlyName>Dev Printer</FriendlyName>
                    <FirmwareVersion>1.00</FirmwareVersion>          } 901
                    <SerialNumber>1111</SerialNumber>
                </ThisDevice>
            </MetadataSection>
            <MetadataSection>
                <ThisModel>
                    <Manufacturer>Xxxxx</Manufacturer>
                    <ManufacturerUrl>http://www.xxxx.com</ManufacturerUrl>
                    <PresentationUrl>http://192.168.0.1</PresentationUrl>   } 902
                    <ModelName>LBPXXXX</ModelName>
                </ThisModel>
            </MetadataSection>
            <MetadataSection>
                <Relationship>
                    <Hosted>
                        <EndpointReference>
                            <Address>http://192.168.0.1/wsd/print</Address>
                        </EndpointReference>                             } 903
                        <Types>PrinterServiceType<Types>
                        <ServiceId>uri:123456</ServiceId>
                        <DeviceAttribute>public</DeviceAttribute>
                    </Hosted>
                </Relationship>
            </MetadataSection>
        <Metadata>
    </Body>
</Envelope>
```

FIG. 10

```
<Envelope>
    <Header>
        <Action>Bye</Action>
        <MessageID>1</MessageID>
        <To>urn:discovery</To>
    </Header>
    <Body>
        <Bye>
            <EndpointReference>
                <Address>urn:uuid:123456</Address>
            </EndpointReference>
        </Bye>
    </Body>
</Envelope>
```

```
<Envelope>
    <Header>
        <Action>Probe</Action>
        <MessageID>1</MessageID>
        <To>urn:discovery</To>
    </Header>
    <Body>
        <Probe>
            <Types>Printer</Types>
        </Probe>
    </Body>
</Envelope>
```

FIG. 14

| ID | UUID | VERSION | DEVICE TYPE | MODEL NAME | DEVICE NAME | URL | ATTRIBUTE VALUE |
|---|---|---|---|---|---|---|---|
| 1 | 123456 | 1 | PRINTER | LBPXXXX | Dev Printer | http://192.168.0.1/wsd/mex | Subnet2 |
| 2 | 987654 | 1 | PRINTER | LBPYYYY | Sales Printer | http://192.168.0.2/wsd/mex | Subnet2<br>Subnet3 |
| 3 | abcdef | 1 | MFP | MFPXXXX | Dev MFP | http://192.168.0.3/wsd/mex | Subnet2<br>Subnet3 |

FIG. 19

| ID | UUID | VERSION | DEVICE TYPE | MODEL NAME | DEVICE NAME | URL |
|---|---|---|---|---|---|---|
| 2 | 987654 | 1 | PRINTER | LBPYYYY | Sales Printer | http://192.168.0.2/wsd/mex |
| 3 | abcdef | 1 | MFP | MFPXXXX | Dev MFP | http://192.168.0.3/wsd/mex |

| ID | UUID | VERSION | DEVICE TYPE | MODEL NAME | DEVICE NAME | URL |
|---|---|---|---|---|---|---|
| 1 | 123456 | 1 | PRINTER | LBPXXXX | Dev Printer | http://192.168.0.1/wsd/mex |

| ID | UUID | VERSION | DEVICE TYPE | MODEL NAME | DEVICE NAME | URL |
|---|---|---|---|---|---|---|
| 2 | 987654 | 1 | PRINTER | LBPYYYY | Sales Printer | http://192.168.0.2/wsd/mex |

~105

INFORMATION PROCESSING APPARATUS, IMAGE FORMING APPARATUS, AND CONTROL METHOD THEREFOR

TECHNICAL FIELD

The present invention relates to an information processing apparatus, an image forming apparatus, and a control method therefor in a search system for searching for an image forming apparatus.

BACKGROUND ART

In general, devices such as printers connected to networks can be used from client personal computers (PCs) over the networks. A client PC first finds a device on a network and then installs therein driver software for using the found device. Several techniques for searching for a device on a network have been available. In some techniques, search request packets are sent via broadcast or multicast. Broadcast and multicast are methods by which data is sent to a plurality of devices present in a network. In those techniques, a client PC sends a search request packet via broadcast or multicast, and a device that receives the search request packet sends a search response packet to the client PC. Thus, the device is found.

Further, a large scale network can be constructed by connecting networks to each other via connection devices such as routers. In such a network, broadcast or multicast routing may affect the traffic of the overall network and routers are generally operated so that such routing is avoided. Segmented networks created by routers are referred to as subnetworks or subnets and broadcast and multicast routing are generally available within a subnet. In such an environment, broadcast- or multicast-based network device search technology prevents a search request packet sent from a client PC from passing through a router. In a network environment where a plurality of subnets are connected via routers, therefore, it is difficult for a client PC to find a device present in a different subnet.

Accordingly, search systems that allow search for a device in a subnet using a client PC in another subnet have been developed. In an example of such search systems, a search server (discovery proxy (DP)) is located on a network. A client PC sends a search request message including a search condition to a DP, and the DP searches for a device on behalf of the client PC in response to the search request message (see, for example, Patent Citation 1).

The search system of the related art described above allows a client PC to search for all devices present in a subnet different from that in which the client PC is present. In practice, however, usage differs from one device to another. For example, some devices are permitted to be accessed from a client PC within the same subnet and other devices are permitted to be accessed from outside the same subnet. For instance, in an intranet where a subnet is provided for each section, a device can be accessed only from a specific section and another device can be accessed from all the sections. With the use of the method of the related art described above, however, all devices may be accessible (or searchable) from outside subnets regardless of such a situation.

Patent Citation 1: Japanese Patent Laid-Open No. 2001-216107

DISCLOSURE OF INVENTION

The present invention provides a search system in which a server is provided to search for a device, wherein the search for devices can be restricted in accordance with the usage of each device.

In a first aspect of the present invention, an information processing apparatus includes a receiving unit configured to receive a search request sent from an external apparatus, a search unit configured to search for a device matching a search condition included in the search request, a determination unit configured to determine an attribute of a device, and a transmission control unit configured to perform control so that information regarding the device is sent to the external apparatus as a search result in response to the search request when the device matching the search condition has a first attribute and so that the information regarding the device is not sent to the external apparatus as a search result in response to the search request when the device matching the search condition has a second attribute.

In a second aspect of the present invention, an image forming apparatus connected to a network including a plurality of groups includes a receiving unit configured to receive a request for obtaining device information regarding the image forming apparatus from an information processing apparatus, a determination unit configured to determine whether or not a group to which the information processing apparatus belongs and a group to which the image forming apparatus belongs match, a transmission control unit configured to perform control so that the device information regarding the image forming apparatus is sent to the information processing apparatus in response to the request when the determination unit determines that the groups match and so that the device information regarding the image forming apparatus is not sent to the information processing apparatus when the determination unit determines that the groups do not match.

Other features, objects and advantage of the present invention will be apparent from the following description when taken in conjunction with the accompanying drawings, in which like reference characters designate the same or similar parts throughout the figures thereof.

The accompanying drawings, which are incorporated in and constitute a part of the specification, illustrate exemplary embodiments of the invention and, together with the description, serve to explain the principles of the invention.

BRIEF DESCRIPTION OF THE DRAWINGS

FIG. 6 is a diagram showing an example of device information held in a device information holding unit of the DP.

FIG. 7 is a diagram showing an example of a Hello message according to the present exemplary embodiment.

FIG. 8 is a diagram showing an example of a Get message according to the present exemplary embodiment.

FIG. 9 is a diagram showing an example of a GetResponse message according to the present exemplary embodiment.

FIG. 10 is a diagram showing an example of a Bye message according to the present exemplary embodiment.

FIG. 11 is a diagram showing an example of a Probe message according to the present exemplary embodiment.

FIG. 14 is a diagram showing an example of device information held in a device attribute holding unit of the DP.

FIG. 19 is a diagram showing an example of device information held in a device information holding unit of a parent DP according to the second exemplary embodiment.

FIG. 20 is a diagram showing an example of device information held in a device information holding unit of a DP according to the second exemplary embodiment.

FIG. 21 is a diagram showing an example of device information held in a device information holding unit of another DP according to the second exemplary embodiment.

DESCRIPTION OF EMBODIMENTS

First Exemplary Embodiment

Figure 1:
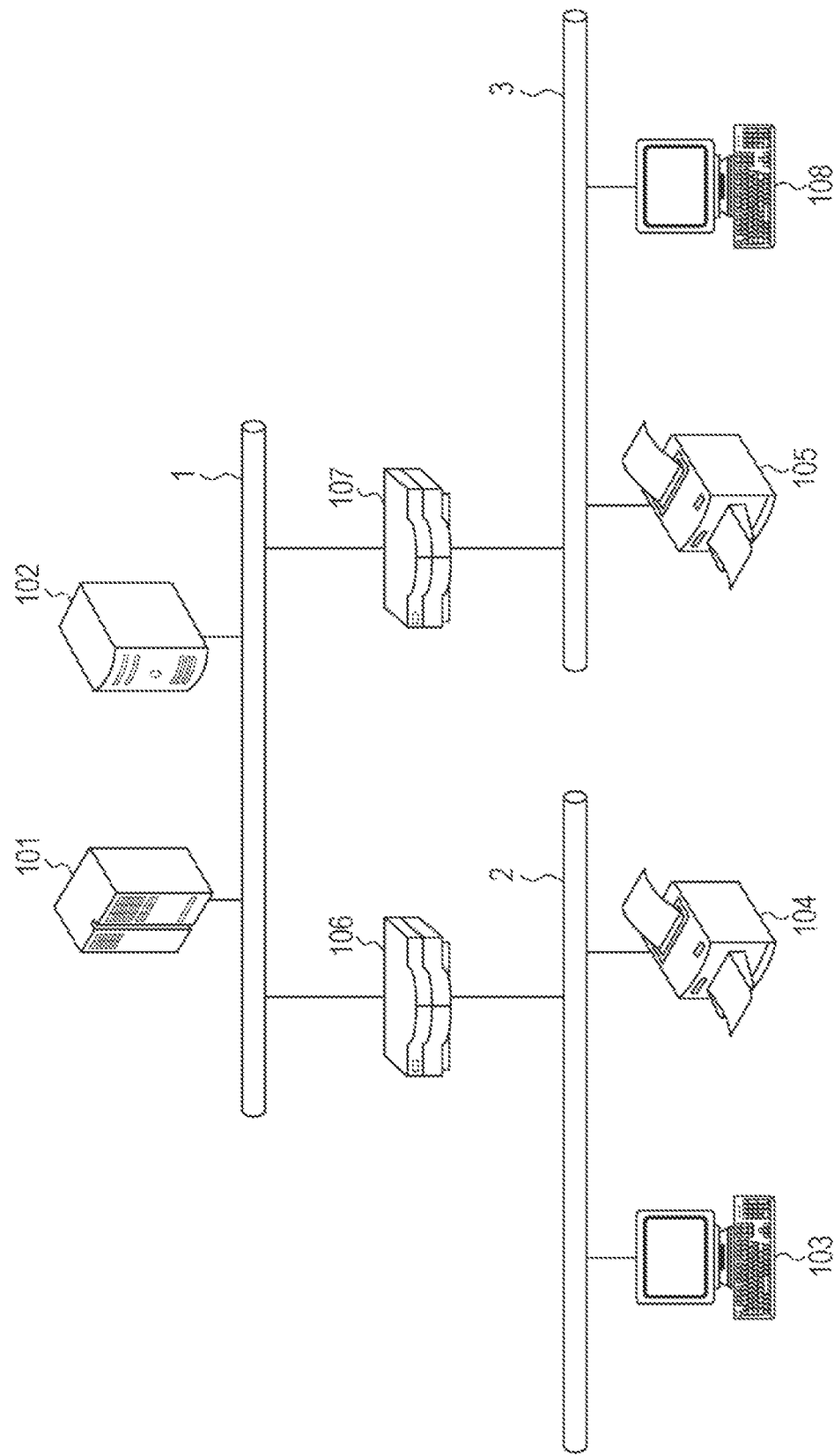
FIG. 1 is a diagram showing a structure of a network search system according to an exemplary embodiment of the present invention.

FIG. 1 is a diagram showing a structure of a device search system according to an exemplary embodiment of the present invention. A dynamic host configuration protocol (DHCP) server 101 and a discovery proxy (hereinafter referred to as a "DP") 102 searching as a search server are connected to a subnet 1. A client PC 103 and an image forming apparatus 104 are connected to a subnet 2. A client PC 108 and an image forming apparatus 105 are connected to a subnet 3. The subnets 1 and 2 are connected to each other via a router 106, and the subnets 1 and 3 are connected to each other via a router 107. The subnets 1 to 3 form one local area network (LAN). Consequently, the terminals connected to all the subnets can communicate with each other. Each of the routers 106 and 107 is configured not to allow broadcast or multicast received from one subnet to directly pass therethrough to another subnet. Thus, communication via broadcast or multicast is available only within each subnet. Here, in the apparatuses in the present exemplary embodiment, each of the image forming apparatuses 104 and 105 is an example of a device according to the present invention, and may be a printer, a copier, a scanner, a multifunction device, a facsimile, or the like. In the apparatuses in the present exemplary embodiment, each of the DHCP server 101, the DP 102, and the client PCs 103 and 108 is an example of an information processing apparatus according to the present invention, and may be a general-purpose PC, which will be described below. In the device search system shown in FIG. 1, in order to search for an image forming apparatus desired by a user who operates the client PC 103, a search request packet is sent from the client PC 103 or 108 to the DP 102. Then, after a device is found in the DP 102, a search result is sent to the client PC 103 or 108.

Next, a method for distributing setting information such as an Internet protocol (IP) address using DHCP will be described. DHCP is a protocol that defines a mechanism for distributing setting information to terminals connected to a network, the details of which are defined in Request for Comments (RFC) 2131. DHCP adopts a client-server method. A DHCP server provides centralized management of various types of setting information, and a DHCP client, or a network terminal, receives such setting information.

Figure 2:
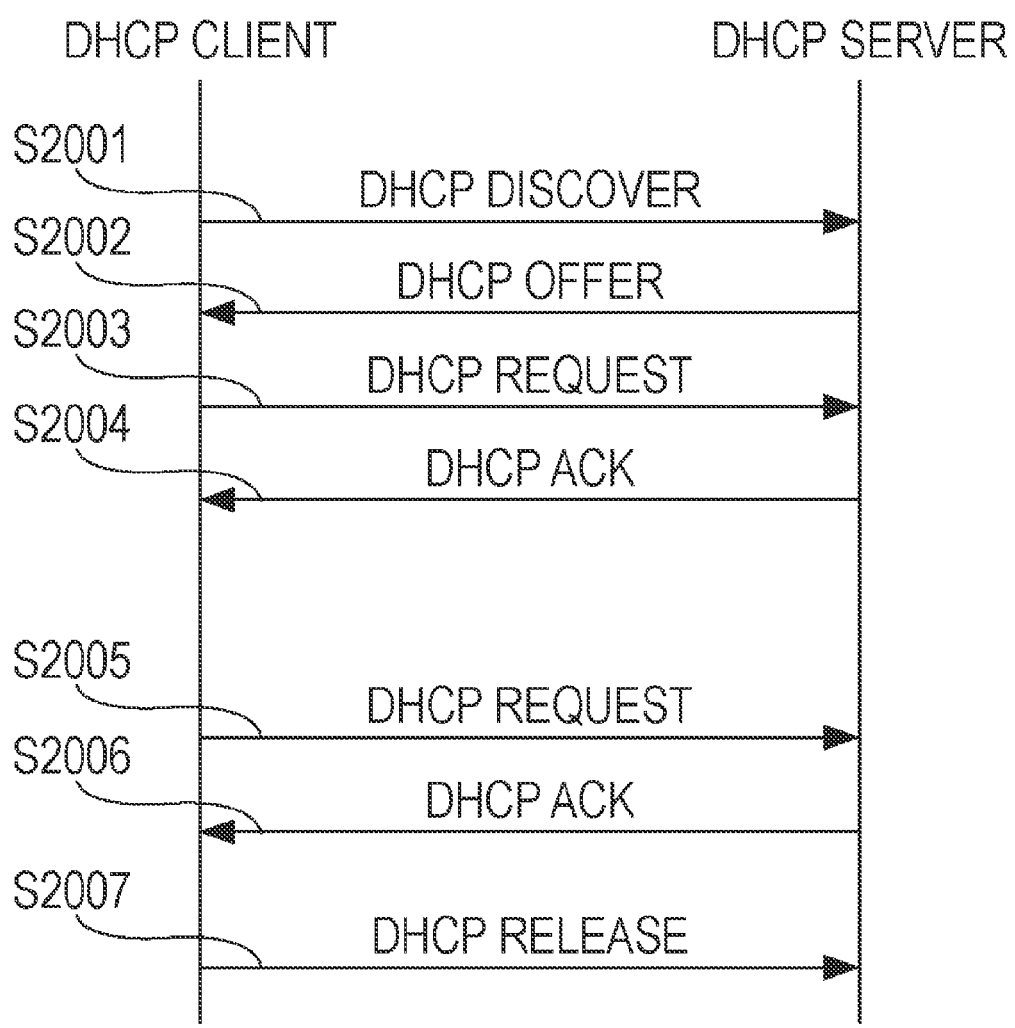
FIG. 2 is a diagram showing a flow of dynamic host configuration protocol (DHCP) messages sent and received between a DHCP server and a DHCP client.

FIG. 2 is a sequence diagram describing a flow of DHCP messages sent and received between a DHCP server and a DHCP client. The DHCP client broadcasts a DHCP DISCOVER message (S2001). Upon receipt of the DHCP DISCOVER message, the DHCP server allocates an IP address to the DHCP client that has sent the message, and then sends a DHCP OFFER message (S2002). The DHCP OFFER message includes the IP address assigned to the DHCP client that has sent the DHCP DISCOVER message and other setting information.

Upon receipt of the DHCP OFFER message, the DHCP client broadcasts a DHCP REQUEST message for using the IP address included in the DHCP OFFER message (S2003). Upon receipt of the DHCP REQUEST message, the DHCP server sends a DHCP ACK message (S2004). Upon receipt of the DHCP ACK message, the DHCP client performs subsequent network communications using the distributed IP address and setting information.

The IP address distributed from the DHCP server has a period (lease time) during which the IP address can be used. In order to continuously use the obtained IP address after the lease time has expired, the DHCP client sends a DHCP REQUEST message to the DHCP server before the lease time has expired (S2005). Upon receipt of the DHCP REQUEST from the assigned IP address, the DHCP server updates the lease time and sends a DHCP ACK message (S2006).

When the DHCP client stops using the IP address, the DHCP client sends a DHCP RELEASE message to the DHCP server (S2007). Upon receipt of the DHCP RELEASE message, the DHCP server releases the assigned IP address so that this IP address can be assigned to another DHCP client.

Further, when the lease time has elapsed without a DHCP REQUEST coming from the assigned IP address before the lease time has expired, the DHCP server releases the assigned IP address so that this IP address can be assigned to another DHCP client.

In the flow shown in FIG. 2, in S2001 to S2004, the messages are sent via broadcast. This is because the DHCP client has not been assigned an IP address at the respective time points.

In a network in which, as in the configuration shown in FIG. 1, a plurality of subnets are connected via routers, if routers are configured to prevent broadcast from passing therethrough, the DHCP messages handled in S2001 to S2004 are blocked by the routers. In order to overcome this inconvenience, RFC 2131 provides a specification for a relay agent. A relay agent is generally implemented as a function of a router, and the operation thereof will be briefly described using the symbols shown in FIG. 1.

First, the router 106, which implements a relay agent function, stores the IP address of the DHCP server 101 in advance. The client PC 103 serving as a DHCP client broadcasts a DHCP DISCOVER or DHCP REQUEST message to the subnet 2. Upon receipt of the DHCP DISCOVER or DHCP REQUEST message, the router 106 transfers the message via unicast to the DHCP server 101 having the message stored therein in advance. Upon receipt of the DHCP DISCOVER or DHCP REQUEST message from the router 106 via unicast, the DHCP server 101 sends a DHCP OFFER or DHCP ACK message to the router 106 via unicast. Upon receipt of the DHCP OFFER or DHCP ACK message from the DHCP server 101, the router 106 broadcasts this message to the subnet 2.

In this manner, a router implementing a relay agent function receives a DHCP message sent via broadcast and transfers the DHCP message to a DHCP server via unicast. Thus, a DHCP client can receive information from the DHCP server.

Figure 3:
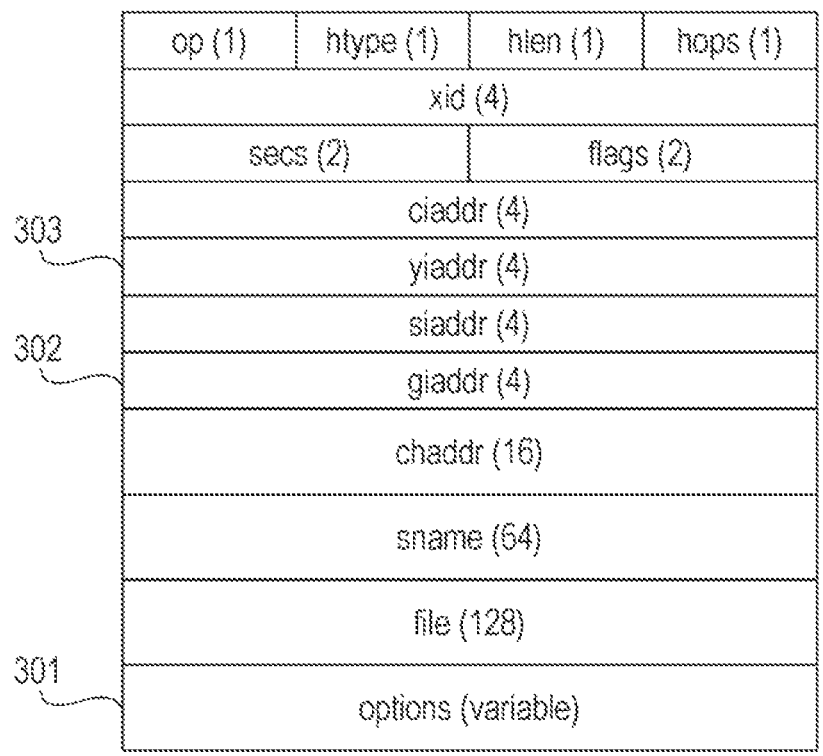
FIG. 3 is a diagram showing a format of a DHCP message.

FIG. 3 is a diagram showing a format of a DHCP message. An "options" field 301 is a field in which various data of variable lengths can be set. In this field, a plurality of pieces of option data, each piece of option data having a 1-byte tag, a 1-byte data size, and variable length data, can be set. The value of the tag may be a pre-standardized value or a vendor-extendable value. The value of the tag such as, for example, a subnet mask or an IP address of a domain name system (DNS) server is widely used as a standardized value.

In the present exemplary embodiment, an extension of the "options" field 301 is used. A tag indicating the IP address of a DP is defined and the IP address of the DP is set as data so that IP address information regarding the DP can be distributed to a client PC or a DHCP client such as a device using the DHCP protocol. Further, in a case where a plurality of DPs are present in a network, the IP addresses of the plurality of DPs are set in the "options" field 301 so that IP address information regarding the DPs can be distributed.

In a "giaddr" field 302, the IP address of a relay agent is set when the relay agent transfers a DHCP message to the DHCP server. Thus, when the DHCP server receives a DHCP message, if the DHCP message is sent from the relay agent, the DHCP server can specify a subnet to which the DHCP client belongs by referring to the "giaddr" field. In a "yiaddr" field 303, an IP address assigned to the DHCP client by the DHCP server is set.

Next, the hardware and software configuration of the DHCP server 101, DP 102, client PCs 103 and 108, image forming apparatuses 104 and 105 according to the present invention in the system configuration shown in FIG. 1 will be described. In the following description, the image forming apparatus 104 is used as a representative for the image forming apparatuses 104 and 108 unless otherwise stated.

Figure 4:
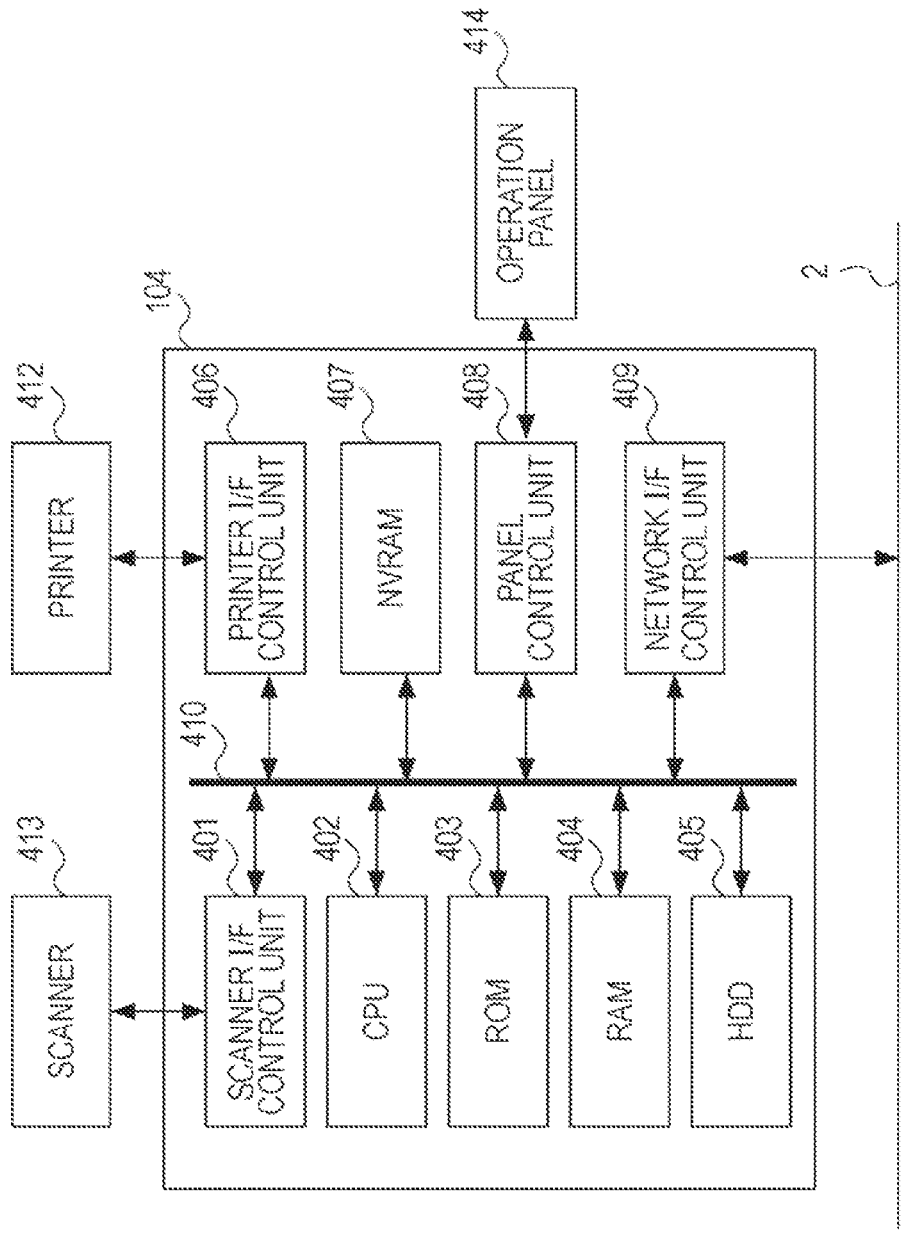
FIG. 4 is a block diagram showing a hardware configuration of an image forming apparatus.

FIG. 4 is a block diagram showing a hardware configuration of the image forming apparatus 104. A scanner interface (I/F) control unit 401 is a unit that controls a scanner 413. A central processing unit (CPU) 402 executes a software program for a printing apparatus to control the overall operation of the apparatus. A read-only memory (ROM) 403 stores a boot program, fixed parameters, and the like of the apparatus. A random access memory (RAM) 404 is used to temporarily store data when the CPU 402 controls the apparatus. A hard disk drive (HDD) 405 is used to store various data such as print data. A printer I/F control unit 406 is a unit that controls a printer 412. A non-volatile random access memory (NVRAM) 407 is used to save various setting values of the printing apparatus. A panel control unit 408 controls an operation panel 414 to display various information and enter instructions from a user. A network I/F control unit 409 controls transmission and reception of data to and from a network. A bus 410 is a system bus connected to the scanner I/F control unit 401, the CPU 402, the ROM 403, the RAM 404, the HDD 405, the printer I/F control unit 406, the NVRAM 407, the panel control unit 408, and the network I/F control unit 409 so that control signals from the CPU 402 or data signals between the units can be sent and received through the bus 410.

Figure 16:
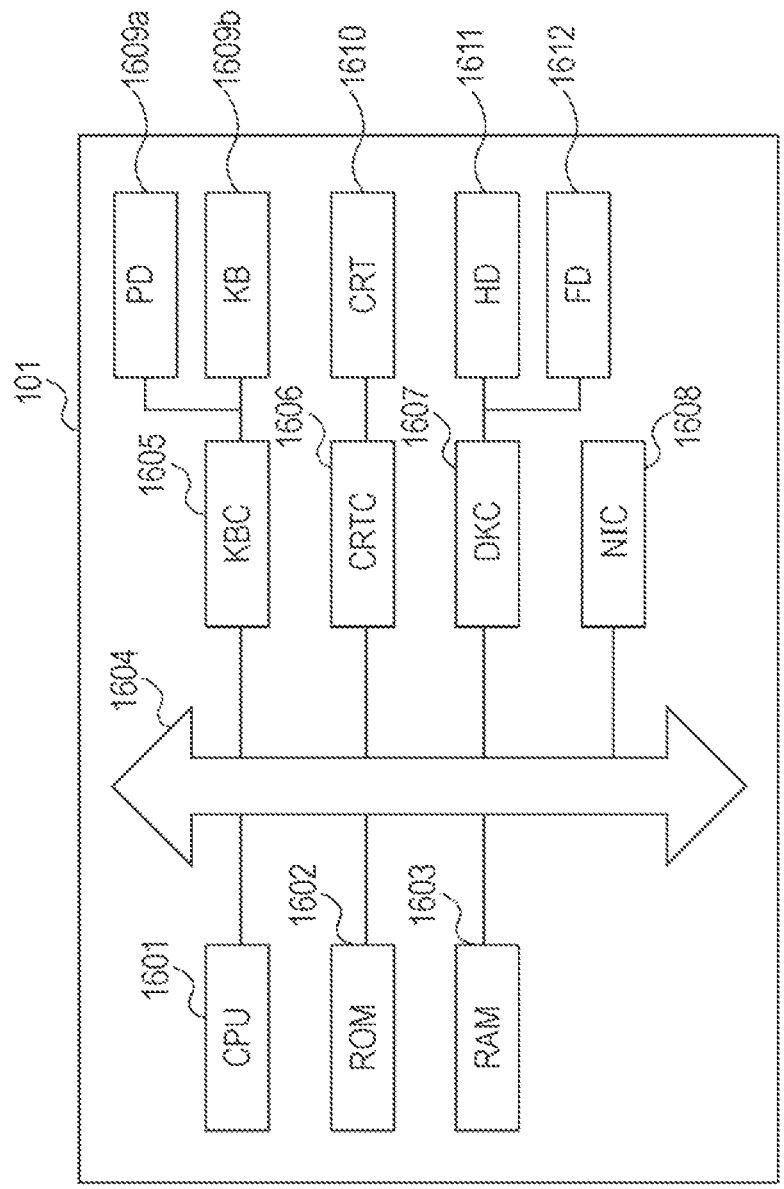
FIG. 16 is a block diagram showing a hardware configuration of the DHCP server, the DP, and the client PC.

FIG. 16 is a block diagram showing a hardware configuration of the DHCP server 101, the DP 102, and the client PCs 103 and 108.

The DHCP server 101, the DP 102, and the client PCs 103 and 108 may be each implemented by a general-purpose PC, and have a common configuration, which will be described hereinafter.

In FIG. 16, a CPU 1601 controls the operation of various devices connected to a system bus 1604. A ROM 1602 stores a basic input/output system (BIOS) or a boot program, and a RAM 1603 is used as a main storage device of the CPU 1601. A keyboard controller (KBC) 1605 performs processing involving the input of information or the like from a pointing device 1609a such as a mouse or a keyboard 1609b. A display control unit (cathode ray tube controller (CRTC)) 1606 has an internal video memory. In accordance with an instruction from the CPU 1601, image data is rendered in the video memory and the image data rendered in the video memory is output to a CRT display device 1610 as a video signal. In FIG. 16, a CRT is used as a display device by way of illustrative example. Alternatively, any other display device such as a liquid crystal display may be used. A disk controller (DKC) 1607 accesses a hard disk 1611 or a floppy (registered trademark in Japan) disk 1612. A network interface card (NIC) 1608 is connected to a network to control transmission and reception of data via the network.

The hard disk 1611 stores an operating system (OS), various application programs that operate on the OS, and the like.

In the configuration described above, when the power of the apparatus is turned on, the CPU 1601 reads the OS from the hard disk 1611 into the RAM 1603 in accordance with the boot program stored in the ROM 1602, and functions as an information processing apparatus.

Figure 5:
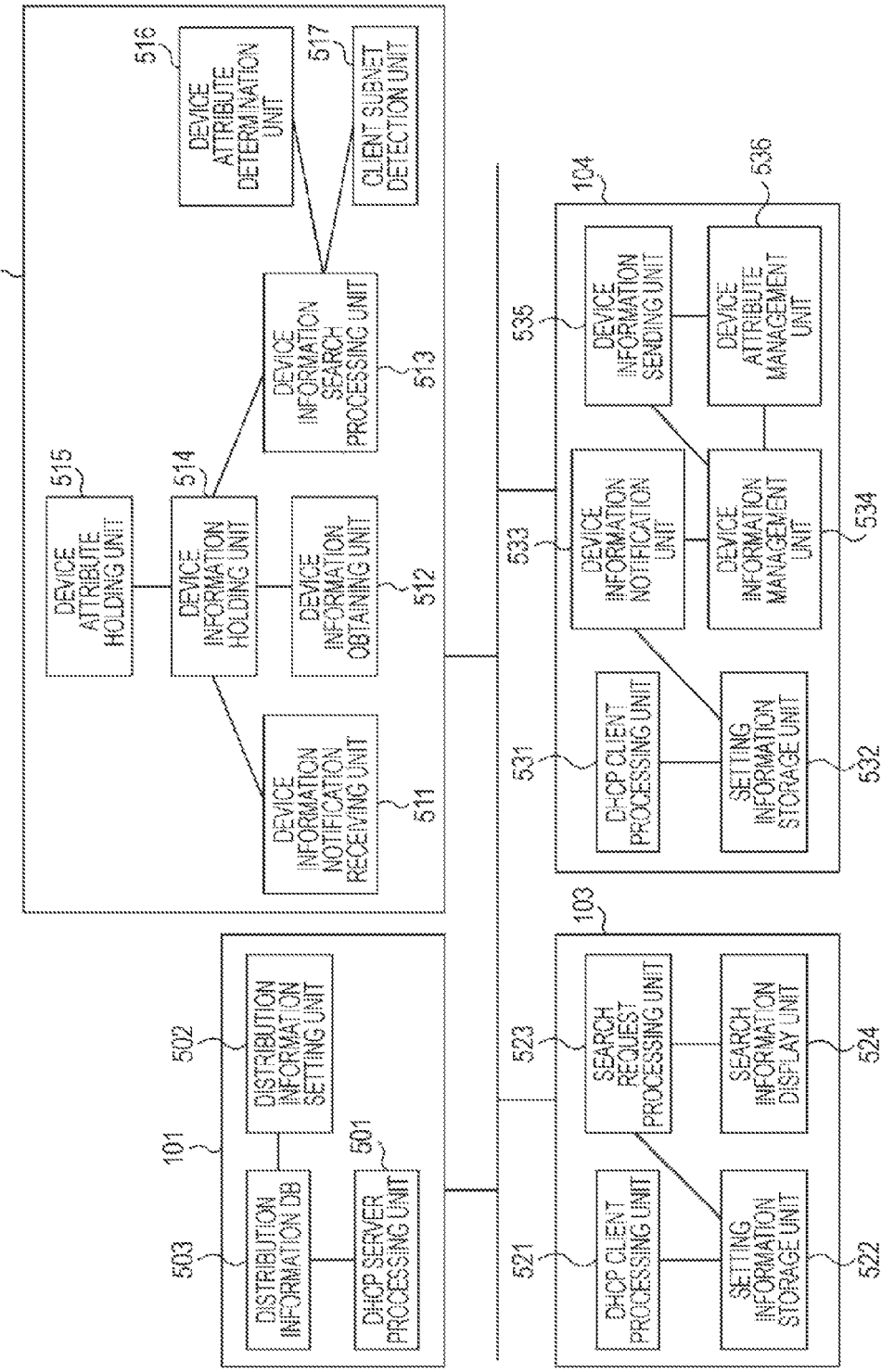
FIG. 5 is a block diagram showing a software configuration of a DHCP server, a DP, a client PC, and an image forming apparatus.

FIG. 5 is a block diagram showing a software configuration of the DHCP server 101, the DP 102, the client PCs 103 and 108, and the image forming apparatus 104. Processing units shown in the block diagram are program modules and are executed by the CPU incorporated in each apparatus.

In the DHCP server 101, a DHCP server processing unit 501 performs the DHCP server processing described above. An IP address list and setting information to be distributed to clients are held in a distribution information DB 503. In response to a request from a client, the DHCP server processing unit 501 refers to the distribution information DB 503 and distributes various information. A distribution information setting unit 502 sets information to be held in the distribution information DB 503. Examples of information that can be set include the IP address of the DP 102. Information to be distributed may also be set for each subnet to which clients belong or for each client.

In the DP 102, a device information notification receiving unit 511 receives a notification of a registration, update, or deletion request of device information from the image forming apparatus 104, and processes device information held in a device information holding unit 514 on the basis of the type of the notification.

As a result of the process, if it is determined that it is necessary to obtain device information, a device information obtaining unit 512 sends a device information obtaining request to the image forming apparatus 104, and holds received device information in the device information holding unit 514. The device information holding unit 514 is equipped with a device attribute holding unit 515 in which a device attribute value included in device information sent from the image forming apparatus 104 is saved. A device information search processing unit 513 receives a device information search request from the client PC 103, and searches the device information held in the device information holding unit 514 on the basis of a specified search condition. A search result is sent to the client PC 103. In this case, a client subnet detection unit 517 obtains an address for specifying a subnet in which the client PC 103 is present (for example, a subnet mask or the prefix of an address). A device attribute determination unit 516 selects only a device that is permitted to respond to a search from the determined subnet in which the client PC 103 is present on the basis of the attribute value held in the device attribute holding unit 515, and sends information regarding only the selected device to the client PC 103. The device information held in the device information holding unit 514 will be described below.

In the client PC 103, a DHCP client processing unit 521 performs the DHCP client processing described above. An IP address and various setting information distributed from the DHCP server 101 are held in a setting information storage unit 522, and can be referred to and used as desired. A search request processing unit 523 performs a device search on the DP 102, and a result is displayed on a search information display unit 524.

In the image forming apparatus 104, a DHCP client processing unit 531 performs the DHCP client processing described above. An IP address and various setting information distributed from the DHCP server 101 are held in a setting information storage unit 532, and can be referred to and used as desired. A device information management unit 534 manages device information regarding the image forming apparatus 104. A device information notification unit 533 sends a registration, update, or deletion request of device information to the DP 102 when a notification of device information is necessary. A device information sending unit 535 receives a device information obtaining request via a network, and sends the device information managed by the device information management unit 534 to the requester. The device information management unit 534 is equipped with a device attribute management unit 536 in which attribute information set through the operation panel 414 or the network I/F control unit 409 is held. When the image forming apparatus 104 sends the device information to the DP 102, the attribute information held in the device attribute management unit 536 is also sent.

FIG. 6 shows an example of a device information table held in the device information holding unit 514 of the DP 102. In the example shown in FIG. 6, three pieces of device information are registered in a device information table. Each piece of device information includes detail information regarding each device, which will be described hereinafter.

An ID 601 represents an identifier (ID) for identifying the device in the DP. A UUID 602 represents a universally unique identifier (UUID) for globally identifying the device. A version 603 represents a version of the device information. A device type 604 is information indicating the type of the device such as "MFP" which stands for a multifunction peripheral device or "Printer" which stands for a printer. A model name 605 represents a model name of the device such as "LBPXXXX". A device name 606 represents a name that is assigned to the device by an administrator of the device. A URL 607 represents a uniform resource locator (URL) for obtaining the device information. An attribute value 608 represents an attribute value indicating a range in which the device is searched for. In FIG. 6, two attribute values, namely, "public" and "private", are used as attribute values by way of example. The "public" attribute means that the device can be searched for by a client PC in a subnet different from a subnet in which the device is present, and the "private" attribute means that the device can be searched for only by a client PC in the same subnet as a subnet in which the device is present. The "public" attribute is an example of a first attribute, and the "private" attribute is an example of a second attribute. The attribute values may be sent from devices at any timing or may be manually set in the DP 102 by users. Although not shown in FIG. 6, the IP address of the device is registered in the device information. In a flow described below (see FIG. 15), the DP 102 determines a subnet address of the device using the IP address and subnet mask of the device. Accordingly, the subnet in which the device is present can be specified.

In the example shown in FIG. 6, device information with an ID of 1 indicates information regarding the image forming apparatus 104, and device information with an ID of 2 indicates information of the image forming apparatus 105. Detail information registered as device information in the device information table is not limited to that shown in FIG. 6. For example, information indicating the performance of a printer or a multifunction device (such as the presence of a color printing function or the presence of a duplex printing function) may be included.

Next, a process of registering the device information regarding the image forming apparatus 104 in the DP 102 will be described. The image forming apparatus 104 has received the IP address of the DP 102, as well as the IP address of the image forming apparatus 104, from the DHCP server 101.

When the power of the image forming apparatus 104 is turned on or when the device information is changed, the image forming apparatus 104 sends a Hello message in the form of extensible markup language (XML) as shown in FIG. 7 to the DP 102 via unicast to notify the DP 102 of the existence thereof.

The Hello message shown in FIG. 7 is composed of a header section 701 defined by a <Header> tag and a body section 702 defined by a <Body> tag. The Hello message itself is defined by an <Envelope> tag. This structure is common to all messages used in the present exemplary embodiment.

The header section 701 serves as a common header that does not depend on the contents of the message, and includes an <Action> tag, a <MessageID> tag, and a <To> tag. The <Action> tag is used to identify the type of the message. The <MessageID> tag is an identifier for uniquely identifying the message. The <To> tag is used to identify the destination to which the message is to be sent. The structure of the body section 702 changes depending on the contents of the message. In FIG. 7, the <Body> tag is followed by a <Hello> tag which indicates that this message is a Hello message. The <Hello> tag includes an <EndpointReference> tag, a <Types> tag, an <XAddrs> tag, and a <MetadataVersion> tag. The <EndpointReference> tag includes an <Address> tag having an address information for identifying the device. The <Types> tag has type information regarding the device. The <XAddrs> tag has a URL for obtaining the device information. The <MetadataVersion> tag has a version of the device information.

The DP 102 extracts the value of the <Address> tag in the <EndpointReference> tag from the Hello message as a UUID for globally identifying the device. The DP 102 further extracts the value of the <Types> tag as a device type. The DP 102 further extracts the value of the <MetadataVersion> tag as a version of the device information. The DP 102 further extracts the value of the <XAddrs> tag as a URL for obtaining the device information. The extracted pieces of information are stored in the device information holding unit 514. The IP address of the sender of the Hello message is also stored in the device information holding unit 514.

Thereafter, the DP 102 sends a Get message in the form of XML as shown in FIG. 8 to the URL defined in the <XAddrs> tag via unicast. The Get message shown in FIG. 8 is a message having only a header section. In the header section, an <Action> tag indicates that this message is a Get message.

Upon receipt of the Get message, the device information sending unit 535 of the image forming apparatus 104 sends a GetResponse message as shown in FIG. 9.

In the GetResponse message shown in FIG. 9, a body section has device information defined in a <Metadata> tag. The <Metadata> tag includes MetadataSection portions 901, 902, and 903 represented by <MetadataSection> tags. Each of the MetadataSection portions is followed by a tag which specifies the type of information contained therein. The MetadataSection portion 901 includes a <ThisDevice> tag in which information different for each device is stored. A <FriendlyName> tag indicates a name assigned to this device, a <FirmwareVersion> tag indicates a firmware version of this device, and a <SerialNumber> tag indicates a serial number of this device. The MetadataSection portion 902 includes a <ThisModel> tag in which information different for each model of the device is stored. A <Manufacturer> tag indicates a manufacturer of the device, a <ManufacturerUrl> tag indicates a URL of the manufacturer of the device, a <PresentationUrl> indicates a URL that provides information regarding the device, and a <ModelName> tag indicates a model name of the device. The MetadataSection portion 903 includes a <Relationship> tag in which information regarding an internal service of the device is stored. In the present exemplary embodiment, the term "internal service" means a print service provided by an image forming apparatus. The <Relationship> tag is followed by a <Hosted> tag including an <EndpointReference> tag, a <Types> tag, a <ServiceId> tag, and a <DeviceAttribute> tag. The <EndpointReference> tag includes an <Address> tag having address information for using the service. The <Types> tag has type information of the service. The <ServiceId> tag has an identifier for identifying the service in the device. The <DeviceAttribute> tag represents an attribute value indicating a range in which the device can be searched for.

The DP 102 extracts the value of the <FriendlyName> tag as a device name and the value of the <ModelName> tag as a model name from the received device information, and stores the extracted values in the device information holding unit 514.

Next, a process for deleting the device information registered in the DP 102 by using the image forming apparatus 104 will be described.

When the image forming apparatus 104 stops its operation, for example, when the image forming apparatus 104 is shut down, the image forming apparatus 104 sends a Bye message as shown in FIG. 10 to the DP 102 via unicast.

In the Bye message shown in FIG. 10, a body section includes a <Bye> tag indicating that this message is a Bye message. The <Bye> tag includes an <EndpointReference> tag. The <EndpointReference> tag includes an <Address> tag having address information for identifying the device.

The DP 102 extracts UUID information from the Bye message, and deletes the corresponding device information from the device information holding unit 514.

Next, a process in which the client PC 103 searches for an image forming apparatus using the DP 102 will be described. The client PC 103 has received the IP address of the DP 102, as well as the IP address of the client PC 103, from the DHCP server 101.

The client PC 103 sends a Probe message in the form of XML as shown in FIG. 11 to the DP 102 via unicast. In the Probe message shown in FIG. 11, a body section includes a <Probe> tag indicating that this message is a Probe message. The <Probe> tag includes a <Types> tag. The <Types> tag specifies a type of a device to be searched for. In the example shown in FIG. 11, a Probe message indicating that a device whose type is printer is to be searched for is shown.

Figure 12:
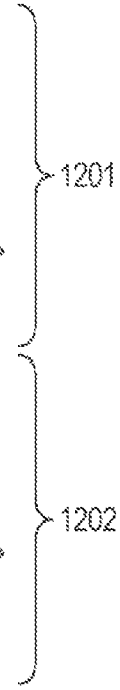
FIG. 12 is a diagram showing an example of a ProbeMatch message according to the present exemplary embodiment.

Upon receipt of the Probe message, the DP 102 extracts the <Types> tag, searches for a device matching the search condition from the device information holding unit 514, and sends a ProbeMatch message as shown in FIG. 12 to the client PC 103. In the present exemplary embodiment, the DP 102 not merely searches for a device matching a search condition but also performs the following processes. The DP 102 obtains the IP address of the sender of the Probe message, and detects a subnet in which the client PC 103 is present on the basis of the IP address of the sender. The DP 102 extracts a piece of device information to be sent as a ProbeMatch message from among the pieces of device information included in the device information table shown in FIG. 6. When the Probe message shown in FIG. 11 is received, device information including device type "Printer" and attribute value "public" or device information including device type "Printer" and attribute value "private", where the subnet in which the device is present is the same as that in which the client PC 103 is present, is extracted. The DP 102 sends the ProbeMatch message created in the manner described above to the client PC 103. In the ProbeMatch message shown in FIG. 12, a body section includes a <ProbeMatches> tag indicating that this message is a ProbeMatch message. The <ProbeMatches> tag includes ProbeMatch portions 1201 and 1202 each of which is defined by a <ProbeMatch> tag. Each ProbeMatch portion corresponds to one search result. In the example shown in FIG. 12, search results indicating that two devices match the condition are shown. Each ProbeMatch portion has the same structure as the <Hello> tag in the Hello message shown in FIG. 7. The search process executed by the DP 102 will be described in detail with reference to FIG. 15.

The client PC 103 extracts the URL defined in the <XAddrs> tag from the ProbeMatch message, and sends a Get message as shown in FIG. 8 via unicast. In the present exemplary embodiment, the URL is composed of the IP address of the image forming apparatus 104, and the Get message is sent directly to the image forming apparatus 104 rather than to the DP 102. The image forming apparatus 104 sends a GetResponse message as shown in FIG. 9, and, upon receipt of the GetResponse message, the client PC 103 extracts necessary information.

When the ProbeMatch message includes a plurality of search results, the client PC 103 repeatedly sends the Get message and obtains all pieces of device information.

Figure 13:
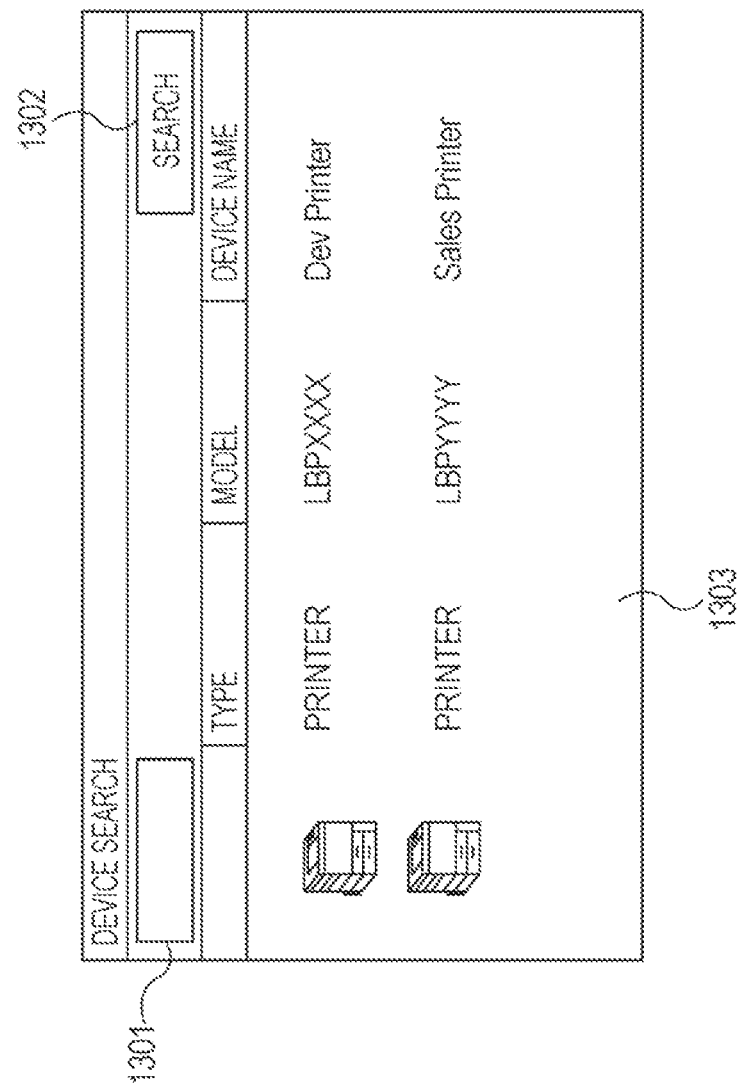
FIG. 13 is a diagram showing an example of a user interface (UI) for searching for an image forming apparatus by using a client PC.

FIG. 13 is a diagram showing an example of a user interface (UI) for searching for an image forming apparatus by using the client PC 103. A screen shown in FIG. 13 is a screen displayed on the CRT 1610 of the client PC 103. In FIG. 13, a field 1301 is a field for specifying the type of the device to be searched for, and a keyword such as "MFP" or "Printer" can be entered. If no keyword is entered in the field 1301, all image forming apparatuses are searched for. When a button 1302 is pressed, a search is executed on the DP 102 in the manner described above. Search results are displayed in a field 1303, and types and model names of devices and device names are displayed at the same time based on the obtained information.

FIG. 14 shows an extension of values that are set in the device attribute holding unit 515 of the DP 102 in the exemplary embodiment described above. In the example described above, only two attribute values, namely, "public" and "private", are used; in the attribute structure shown in FIG. 14, more than two attribute values can be used for classification. For example, in this example structure, a device with an ID of 1 can be searched for only by a client PC in the subnet 2, an a device with an ID of 2 can be searched for from the subnets 2 and 3.

The method in which a device registers, deletes, or updates the existence thereof in a DP, and the method in which a client PC searches for a device are the same as or similar to those in the exemplary embodiment described above. Specifically, a client PC sends a message for searching for a device to a DP. The DP obtains the sender address of the message sent from the client PC to detect a subnet, and compares the detected subnet with registered subnets of devices to determine whether the detected subnet matches one of the registered subnets or whether a search from the subnet in which the client PC is present is permitted when the detected subnet does not match any of the registered subnets on the basis of the attribute value. If the search is permitted, the DP returns a ProbeMatch message including information indicating that the search is permitted.

In this example structure, the attribute value that can be set is not limited to subnet information and may include an identifier for specifying a location of a client PC in a network. Examples of such an identifier may include, other than subnet information, an IP address, a range of IP addresses, a media access control (MAC) address, a multicast address, and a broadcast address.

Figure 15:
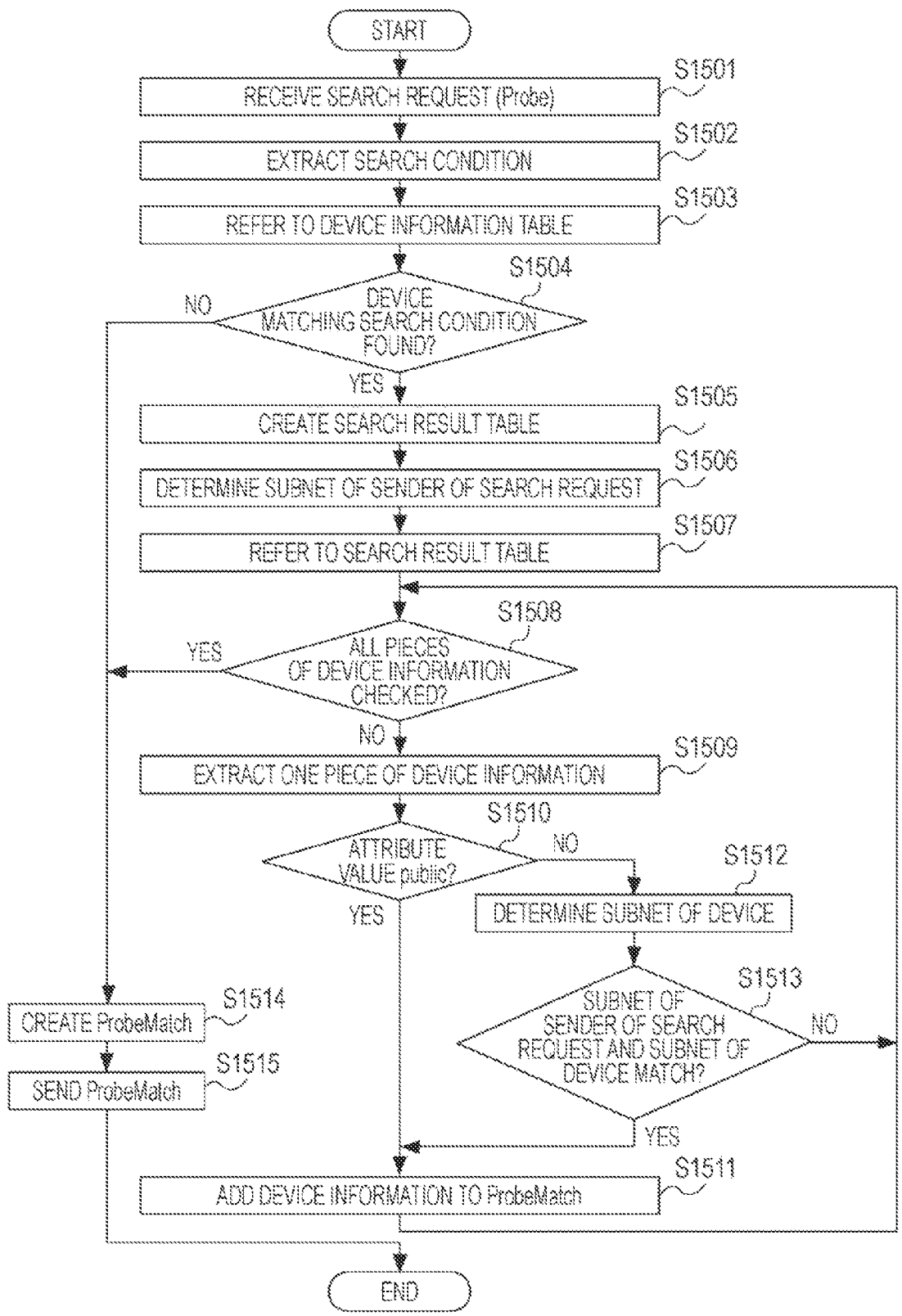
FIG. 15 is a flowchart showing a device search process in a DP.

FIG. 15 is a flowchart showing a device search process executed by the DP 102 according to the present exemplary embodiment. The steps shown in FIG. 15 are processed by the CPU 1601 of the DP 102 according to a program stored in the ROM 1602 or HD 1611 which is developed into the RAM 1603 and executed.

In step S1501, the DP 102 receives a search request (Probe message) sent from a client PC serving as an external apparatus. In step S1502, the CPU interprets the received Probe message and extracts a search condition. For example, "Printer" defined in the <Types> tag in the Probe message shown in FIG. 11 is extracted as a search condition.

In step S1503, the CPU refers to the device information table held in the device information holding unit 514. Then, in step S1504, the CPU compares the extracted search condition with a plurality of pieces of device information included in the device information table to determine whether or not a device matching the search condition is found. If a device matching the search condition is found, the process proceeds to step S1505. Otherwise, the process proceeds to step S1514.

In step S1505, the CPU creates a search result table. The search result table is composed of pieces of device information regarding devices matching the received search condition from among the pieces of device information included in the device information table. The search result table has at least one or more pieces of device information. In step S1506, the CPU determines a subnet in which the client PC that has sent the search request (Probe message) is present. Specifically, the CPU determines a network address from the IP address and subnet mask of the sender that has sent the search request received in step S1501, and determines a subnet accordingly.

Thereafter, in step S1507, the CPU refers to the created search result table. In step S1508, it is determined whether or not all the pieces of device information included in the search result table have been checked. If all the pieces of device information have not been checked, the CPU proceeds to step S1509. If all the pieces of device information have been checked, on the other hand, the process proceeds to step S1514. Specifically, a flag indicating completion of a check may be set in a piece of device information that has been checked, and it may be determined whether or not this flag has been set in all the pieces of device information in the search result table. In step S1509, the CPU extracts one piece of device information from the search result table. In step S1510, the CPU refers to the attribute value of the extracted piece of device information to determine whether or not the attribute value is "public". If it is determined that the attribute value is "public", the process proceeds to step S1511, in which the extracted piece of device information is added to a ProbeMatch message in order to send this piece of device information to the client PC as a search result. Then, the process returns to step S1508 and continues. If it is determined in step S1510 that the attribute value is not "public", that is, if the attribute value is "private", on the other hand, the process proceeds to step S1512. In step S1512, the CPU determines, based on the IP address included in the extracted piece of device information, a subnet in which the corresponding device is present. Specifically, a network address is determined from the IP address and subnet mask included in the piece of device information, and a subnet is determined accordingly. In step S1513, the CPU determines whether or not the subnet determined in step S1506 and the subnet determined in step S1512 match. In other words, it is determined whether or not the client PC that is the sender of the search request and the device are present in the same subnet. If it is determined that both subnets match, the process proceeds to step S1511 and adds the extracted piece of device information to a ProbeMatch message. If the subnets do not match, on the other hand, the process returns to step S1508 without the extracted piece of device information being added to a ProbeMatch message.

If it is determined in step S1508 that all the pieces of device information included in the search result table have been checked, the process proceeds to step S1514. In step S1514, the CPU creates a ProbeMatch message. When a device that matches the search condition and that has "public" attribute or that is present in the same subnet as that in which the sender of the search request is present is found, the device information regarding this device is included in the ProbeMatch message. When a device matching the search condition is not found or when a device that has "public" attribute or that is present in the same subnet is not found, a ProbeMatch message indicating this result is created. In step S1515, the DP 102 sends the created ProbeMatch message to the client PC that has sent the Probe message.

The ProbeMatch message may also be created using a method as follows. Devices that have "private" attribute and that are not present in the same subnet as that in which the sender of the search request is present are extracted based on the search result table, and pieces of device information regarding the extracted devices are deleted from the search result table. Then, a ProbeMatch message is created based on a finally generated search result table.

As described above, according to the present exemplary embodiment, information regarding a device can be registered in a server so that the device can be searched for by only apparatuses belonging to a specific group. The unit of the group may be, but not limited to, a subnet. Position information based on a physical location (such as a room or a building) or any other information may be used as the unit of the group.

Second Exemplary Embodiment

Figure 17:
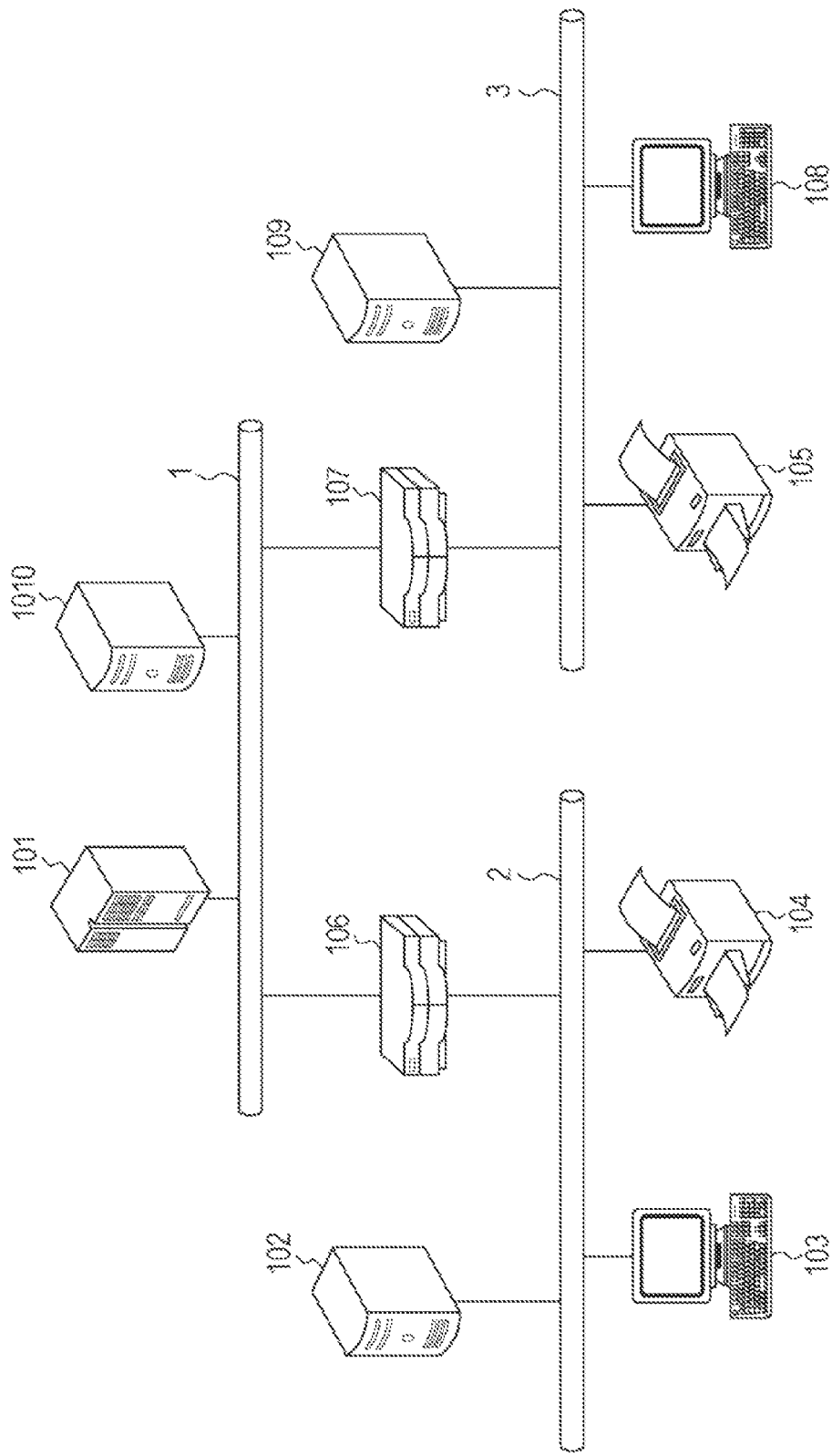
FIG. 17 is a diagram showing a structure of a network search system according to a second exemplary embodiment of the present invention.

FIG. 17 is a diagram showing a network search system according to a second exemplary embodiment of the present invention.

In the present exemplary embodiment, unlike the first exemplary embodiment, instead of only one DP present on a network, DPs each located in a subnet are used. Further, a single specific DP is located on a network that is managed by one DHCP server. In the present exemplary embodiment, the specific DP is referred to as a "parent DP" to distinguish it from the DPs located on the respective subnets.

The network search system shown in FIG. 17 includes subnets 1, 2, and 3. A DP 1010 and a DHCP server 101 are connected to the subnet 1. In the present exemplary embodiment, the DP 1010 is a parent DP. A DP 102, a client PC 103, and an image forming apparatus 104 are connected to the subnet 2. A DP 109, a client PC 108, and an image forming apparatus 105 are connected to the subnet 3.

The subnets 1 and 2 are connected to each other via a router 106, and the subnets 1 and 3 are connected to each other via a router 107. Consequently, terminals connected to all the subnets can communicate with each other. Each of the routers 106 and 107 is configured not to allow broadcast or multicast received from one subnet to directly pass therethrough to another subnet. Thus, communication via broadcast or multicast is available only within each subnet.

The hardware configuration of each DP or the hardware configuration of each image forming apparatus and each client PC are similar to those described above in the first exemplary embodiment unless otherwise stated.

Figure 18:
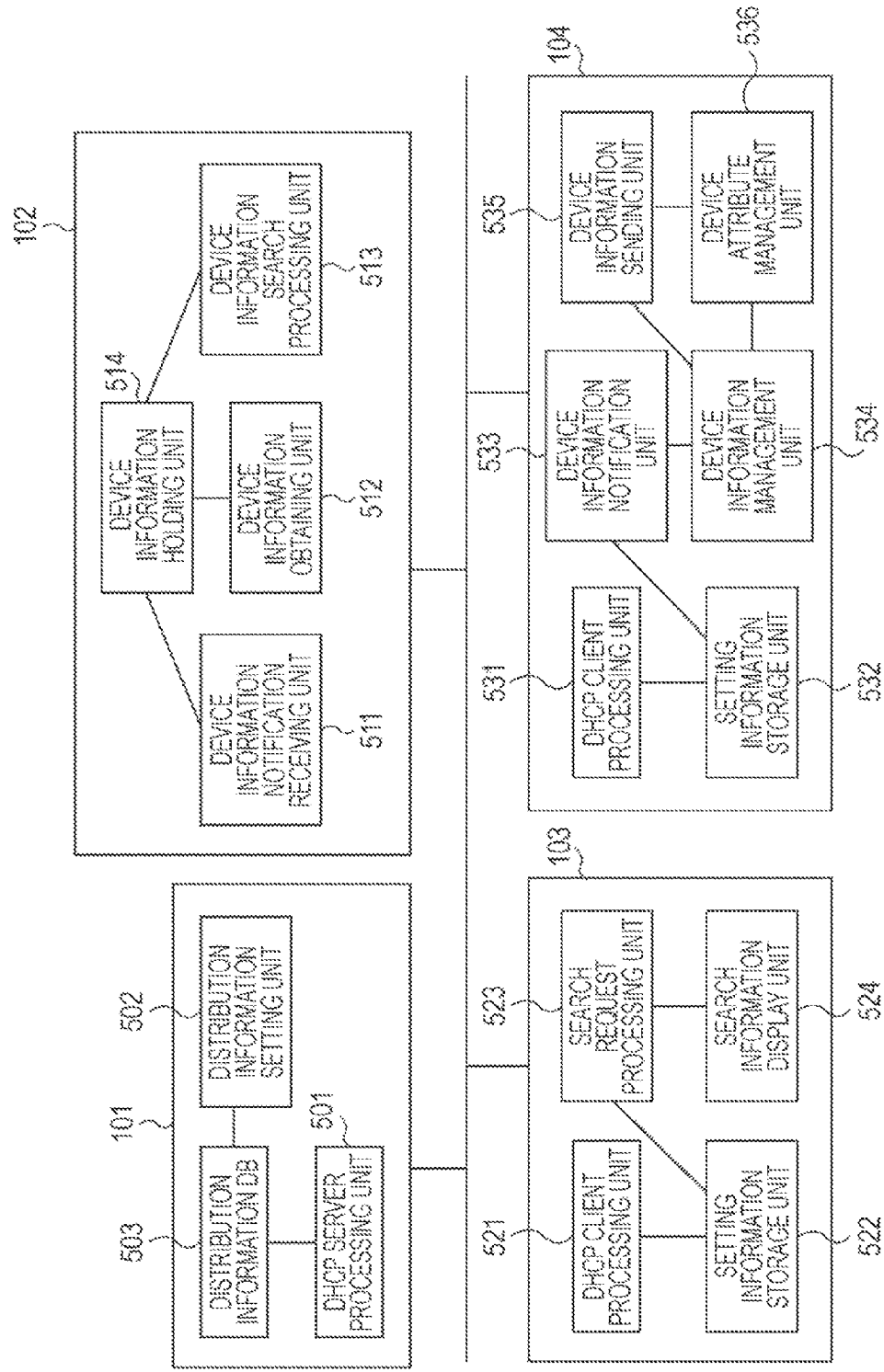
FIG. 18 is a block diagram showing a software configuration of a DHCP server, a DP, a client PC, and an image forming apparatus according to the second exemplary embodiment.

FIG. 18 is a block diagram showing a software configuration of the DHCP server 101, the DP 102, the client PC 103, and the image forming apparatus 104 according to the present exemplary embodiment. The software configuration shown in FIG. 18 is different from that of the first exemplary embodiment shown in FIG. 5 in that the DP 102 does not include a device attribute holding unit, a subnet detection unit for detecting a subnet in which a client to be searched for is presented, or a device attribute determination unit.

In the first exemplary embodiment, in the search process executed by the DP, device information included in a Probe-Match message is modified. The second exemplary embodiment, on the other hand, provides a system in which each image forming apparatus changes a DP in which device information regarding the image forming apparatus is to be registered so that a device can be searched for only by a client PC in a specific group.

Next, an example of a device information table held in each DP residing on a network according to the present exemplary embodiment will be described. In the present exemplary embodiment, each image forming apparatus registers device information only in a DP residing on a subnet in which the image forming apparatus is present and the DP 1010 serving as the parent DP. Note that device information regarding only an image forming apparatus having "public" attribute is registered in the parent DP 1010. In the present exemplary embodiment, it is assumed that the image forming apparatus 104 has "public" attribute and that the image forming apparatus 105 has "private" attribute.

FIG. 19 shows an example of a device information table held in the device information holding unit 514 of the DP 1010 serving as the parent DP. In the present exemplary embodiment, unlike the first exemplary embodiment, the DP 1010 manages only device information regarding devices having "public" attribute which reside on all subnets. Further, unlike first exemplary embodiment, each DP does not hold attribute value of devices. In the example shown in FIG. 19, device information represented by reference numeral 105 is device information regarding the image forming apparatus 105. Remaining device information represents device information regarding an image forming apparatus that is not shown in FIG. 17. This image forming apparatus also has "public" attribute.

FIG. 20 shows an example of a device information table held in the device information holding unit 514 of the DP 102. In the present exemplary embodiment, unlike the first exemplary embodiment, the device information table of the DP 102 only contains device information regarding the image forming apparatus 104 that is present in the same subnet as that in which the DP 102 is present. In the example shown in FIG. 20, the device information represented by reference numeral 104 is the device information regarding the image forming apparatus 104.

FIG. 21 shows an example of the device information table held by the device information holding unit 514 of the DP 109. In the present exemplary embodiment, unlike the first exemplary embodiment, the device information table of the DP 109 only contains the device information regarding the image forming apparatus 105 that is present in the same subnet as that in which the DP 109 is present. In the example shown in FIG. 21, the device information represented by reference numeral 105 is the device information regarding the image forming apparatus 105.

Next, a method for registering the device information regarding the image forming apparatus 104 in the DPs 102 and 1010 will be described.

The image forming apparatus 104 has received the IP addresses of the DPs 102 and 1010, as well as the IP address of the image forming apparatus 104, from the DHCP server 101. In the present exemplary embodiment, when the DHCP server 101 assigns an IP address to the image forming apparatus 104, the DHCP server 101 recognizes a subnet to which the image forming apparatus 104 is connected. Then, the DHCP server 101 notifies the image forming apparatus 104 of the IP address of the DP (DP 102) present in the same subnet as the subnet in which the image forming apparatus 104 is present and the IP address of the parent DP (DP 1010). However, the DHCP server 101 may not necessarily determine a subnet in which the image forming apparatus 104 is present and may notify the image forming apparatus 104 of the IP addresses of all DPs residing on the network.

The image forming apparatus 104 sends a Hello message in the form of XML as shown in FIG. 7 to the DPs 102 and 1010 via unicast to notify them of the existence thereof. In the Hello message shown in FIG. 7, the <XAddrs> tag defines a URL from which the device information regarding the image forming apparatus 104 can be obtained.

Each of the DPs 102 and 1010 extracts necessary values from the Hello message, namely, the value of the <Address> tag in the <EndpointReference> tag as a UUID for globally identifying the device, the value of the <Types> tag as a device type, the value of the <MetadataVersion> tag as a version of the device information, and the value of the <XAddrs> tag as a URL for obtaining the device information, and stores the extracted values in the device information holding unit 514.

Thereafter, each of the DPs 102 and 1010 sends a Get message in the form of XML as shown in FIG. 8 to the URL defined in the <Xaddrs> tag via unicast.

The device information sending unit 535 of the image forming apparatus 104 sends device information as shown in FIG. 9. However, the device information sent here does not include the <DeviceAttribute> tag shown in FIG. 9. In other words, in the second exemplary embodiment, an image forming apparatus sends a response in a format shown in FIG. 9 which does not includes a <DeviceAttribute> tag in response to a Get message sent from a DP.

The DP 102 extracts the value of the <FriendlyName> tag as a device name and the value of the <ModelName> tag as a model name from the received device information, and stores the extracted values in the device information holding unit 514.

When the power of the image forming apparatus 104 is turned on or when the setting information regarding the image forming apparatus 104 is changed, the image forming apparatus 104 sends a Hello message to the DPs 102 and 1010 via unicast. The DPs 102 and 1010 may obtain device information in the manner described above each time they receive a Hello message. If previously obtained device information is stored in the device information holding unit 514, however, the version information included in the Hello message may be compared with that of the stored device information and device information may not be obtained again if the stored device information has not been updated.

A similar process is performed for the image forming apparatus 105. That is, device information regarding the image forming apparatus 105 is registered in the DPs 109 and 1010. The processing performed in the DPs 109 and 1010 is the same as or similar to that described above.

The registration information of image forming apparatuses registered in the DPs 102, 109, and 1010 may be deleted using a method similar to that in the first exemplary embodiment.

Next, a method in which the client PC 103 searches for an image forming apparatus using the DPs 102 and 1010 will be described above.

The client PC 103 has received the IP addresses of the DPs 102 and 1010, as well as the IP address of the client PC 103, from the DHCP server 101.

The client PC 103 sends a Probe message in the form of XML as shown in FIG. 11 to the DPs 102 and 1010 via unicast. In the Probe message shown in FIG. 11, "Printer" is specified in the <Types> tag as a search condition for searching for an image forming apparatus, by way of example.

Upon receipt of the Probe message, each of the DPs 102 and 1010 extracts the <Types> tag, searches for a device matching the search condition in the device information holding unit 514, and sends a ProbeMatch message as shown in FIG. 12 to the client PC 103.

The client PC 103 extracts the URL defined in the <Xaddrs> tag from the ProbeMatch message, and sends a Get message as shown in FIG. 8 via unicast. In the present exemplary embodiment, the URL is composed of the IP address of the image forming apparatus 104, and the Get message is sent directly to the image forming apparatus 104 rather than to the DP 102 or 1010. The image forming apparatus 104 sends device information as shown in FIG. 9, and the client PC 103 extracts necessary information. When the ProbeMatch message includes a plurality of search results, the client PC 103 repeatedly sends the Get message and obtains all pieces of device information.

In the present exemplary embodiment, the client PC 103 is allowed to obtain device information regarding all image forming apparatuses residing on the network. The method in which the client PC 108 searches for an image forming apparatus using the DPs 109 and 1010 is the same as or similar to that described above. Note that, in this case, only image forming apparatuses, except for the image forming apparatus 104, can be searched for.

Figure 22:
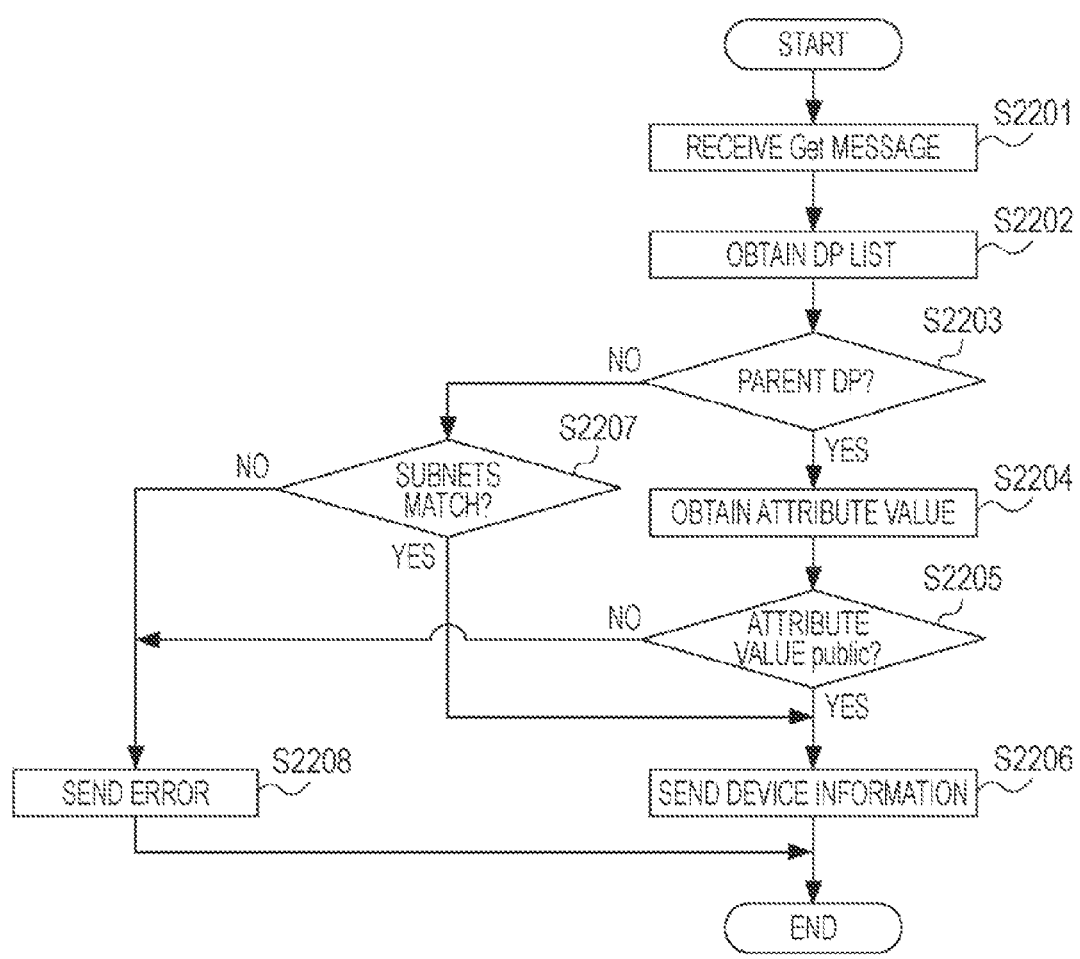
FIG. 22 is a flowchart showing a process executed by an image forming apparatus according to the second exemplary embodiment.

FIG. 22 is a flowchart showing a process executed by the image forming apparatuses 104 and 105 according to the present exemplary embodiment. Specifically, a process in which an image forming apparatus receives a Get message from a DP and sends its device information to the DP is shown. The steps shown in FIG. 22 are processed by the CPU 402 of each of the image forming apparatuses 104 and 105 according to a program stored in the ROM 403 or HDD 405 which is developed into the RAM 404 and executed.

In step S2201, an image forming apparatus receives a Get message sent from a DP. The image forming apparatus has obtained in advance the IP addresses of DPs at the same time as when an IP address is assigned by a DHCP server. Here, the addresses of the DPs obtained in advance include the IP address of a DP present in the same subnet as that in which the image forming apparatus is present and the IP address of the parent DP. The image forming apparatus has held the obtained addresses as a DP list in a memory. In step S2202, the DP list is obtained from the memory.

In step S2203, the CPU compares the IP address of the sender of the Get message with the DP list to determine whether or not the DP that has sent the Get message is the parent DP. If it is determined that the DP is the parent DP, the process proceeds to step S2204. If it is determined that the DP is not the parent DP, on the other hand, the process proceeds to step S2207.

In step S2204, the CPU obtains the attribute value of the image forming apparatus from the memory. Then, in step S2205, it is determined whether or not the obtained attribute value is "public". If it is determined that the attribute value is "public", the process proceeds to step S2206, in which the device information regarding the image forming apparatus is sent to the DP in response to the Get message.

If it is determined in step S2205 that the attribute value is not "public", that is, if it is determined that the attribute value is "private", the process proceeds to step S2208. In step S2208, the CPU sends information indicating an error to the DP in response to the Get message. This can prevent the device information regarding the image forming apparatus from being registered in the parent DP when the image forming apparatus has "private" attribute.

If it is determined in step S2203 that the DP is not the parent DP, the process proceeds to step S2207. In step S2207, the CPU determines whether or not the DP that is the sender of the Get message is present in the same subnet as that in which the image forming apparatus is present. Specifically, the CPU determines whether the IP address of the DP that is the sender of the Get message is included in the DP list obtained in step S2202 and whether the DP is a non-parent DP. If the IP address of the DP is included in the DP list and the DP is not the parent DP, this DP is a DP present in the same subnet as that in which the image forming apparatus is present. In this case, the process proceeds to step S2206, in which the device information regarding the image forming apparatus is sent to the DP. If it is determined that the DP is not present in the same subnet, the process proceeds to step S2208. In this manner, when a DP that has sent a Get message is present in the same subnet as that in which an image forming apparatus is present, device information regarding the image forming apparatus is sent regardless of whether the attribute value is "public" or "private".

As described above, according to the present exemplary embodiment, as in the first exemplary embodiment, information regarding a device can be registered in a server so that the device can be searched for by only apparatuses belonging to a specific group. The unit of the group may be, but not limited to, a subnet. Position information based on a physical location (such as a room or a building) or any other information may be used as the unit of the group. In the present exemplary embodiment, in particular, the device determines whether or not to device information is to be sent in response to an information request from the server. This does not require the server to perform a special process.

In the foregoing exemplary embodiments, an image forming apparatus does not send device information to a DP present in a subnet different from that in which the image forming apparatus is present even when the attribute value of the image forming apparatus is "public". When the attribute value is "public", the image forming apparatus may also send device information to a DP present in a subnet different from that in which the image forming apparatus is present.

Other Exemplary Embodiments

In the foregoing exemplary embodiments, an image forming apparatus and an information processing apparatus serving as a DP are separate apparatuses. Those apparatuses may be implemented by a single apparatus. For example, in the example shown in FIG. 1, the image forming apparatus 104 or the image forming apparatus 105 may have the function of the DP 102. Likewise, a client PC may have the function of a DP in the foregoing exemplary embodiments. Alternatively, an image forming apparatus and a client PC in the foregoing exemplary embodiments may be implemented by a single apparatus.

Further, in the present invention, a storage medium on which computer program code of software implementing the flowcharts of the exemplary embodiments descried above is recorded may be provided to a system or an apparatus. Then, a computer (a CPU or a microprocessing unit (MPU)) of the system or apparatus may read and execute the program code stored in the storage medium to thereby achieve the present invention.

In this case, the program code read from the storage medium implements the functions of the exemplary embodiments described above, and the storage medium storing the program code constitutes an embodiment of the present invention.

Examples of storage media through which the program code is supplied may include a floppy disk, a hard disk, an optical disk, a magneto-optical disk, a compact disk read-only memory (CD-ROM), a CD-Recordable (CD-R), a digital versatile disk ROM (DVD-ROM), a magnetic tape, a non-volatile memory card, and a ROM.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-073686, filed Mar. 21, 2008, which is hereby incorporated by reference herein in its entirety.

The invention claimed is:

1. An information processing apparatus existing on a network which includes a plurality of subnets, the information processing apparatus comprising:
a receiving unit configured to receive a search request sent from an external apparatus;
a search unit configured to search for a device matching a search condition included in the search request; and
a transmission unit configured to transmit, in a case where the device searched for by the search unit and the external apparatus exist in a same subnet, information indicating the device searched for by the search unit to the external apparatus, and configured not to transmit, in a case where the device searched for by the search unit and the external apparatus do not exist in the same subnet, information indicating the device searched for by the search unit to the external apparatus.

2. The information processing apparatus according to claim 1, wherein the device is one of a printer, a copier, a multifunction device, a scanner, and a facsimile device, and
wherein the search condition includes information indicating a type of a device.

3. The information processing apparatus according to claim 1, further comprising a determination unit configured to determine whether an attribute of the device searched for by the search unit is a first type or a second type, wherein the first type indicates that the device is searchable from another apparatus existing in a subnet different from a subnet in which the device exists, and wherein the second type indicates that the device is not searchable from the other apparatus,
wherein, in a case where the determination unit determines that the attribute of the device is the first type, the transmission unit transmits information indicating the device to the external apparatus,
wherein, in a case where the determination unit determines that the attribute of the device is the second type and in a case where the device and the external apparatus exist in the same subnet, the transmission unit transmits information indicating the device to the external apparatus, and
wherein, in a case where the determination unit determines that the attribute of the device is the second type and in a case where the device and the external apparatus do not exist in the same subnet, the transmission unit does not transmit information indicating the device to the external apparatus.

4. The information processing apparatus according to claim 1, further comprising:
an obtaining unit configured to obtain, from a device existing on the network, information regarding the device; and
a holding unit configured to hold the information regarding the device obtained by the obtaining unit,
wherein, based on the information held by the holding unit, the search unit searches a device matching a search condition included in the search request.

5. A method for controlling an information processing apparatus existing on a network which includes a plurality of subnets, the method comprising:
receiving a search request sent from an external apparatus;
searching, using a central processing unit, for a device matching a search condition included in the search request; and
transmitting, in a case where the device searched for and the external apparatus exist in a same subnet, information indicating the device searched for to the external apparatus, and configured not to transmit, in a case where the device searched for and the external apparatus do not exist in the same subnet, information indicating the device searched for to the external apparatus.

6. A non-transitory computer-readable storage medium storing a computer program causing an information processing apparatus to perform the method according to claim 5.

7. The information processing apparatus according to claim 4, wherein the holding unit holds information for each device of a plurality of devices existing on the network.

* * * * *